(12) United States Patent
Marlett et al.

(10) Patent No.: US 7,668,239 B2
(45) Date of Patent: Feb. 23, 2010

(54) SYSTEM AND METHOD FOR TRANSMIT TIMING PRECOMPENSATION FOR A SERIAL TRANSMISSION COMMUNICATION CHANNEL

(75) Inventors: Mark J. Marlett, Livermore, CA (US); Mark Rutherford, Wellington, CO (US); Peter Windler, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 570 days.

(21) Appl. No.: 11/523,784

(22) Filed: Sep. 19, 2006

(65) Prior Publication Data

US 2008/0069267 A1    Mar. 20, 2008

(51) Int. Cl.
*H03K 7/08* (2006.01)
*H03K 3/017* (2006.01)

(52) U.S. Cl. ........................ 375/238; 327/172

(58) Field of Classification Search .................. 375/238, 375/257–259, 296; 340/310.01; 455/132; 327/172

See application file for complete search history.

(56) References Cited

U.S. PATENT DOCUMENTS

| | | | |
|---|---|---|---|
| 6,404,280 B1 * | 6/2002 | Jeng | 330/10 |
| 6,538,484 B1 * | 3/2003 | Rappaport et al. | 327/172 |
| 2002/0113689 A1 * | 8/2002 | Gehlot et al. | 340/310.01 |
| 2002/0176493 A1 * | 11/2002 | Oi | 375/238 |
| 2003/0043926 A1 * | 3/2003 | Terashima et al. | 375/257 |
| 2003/0134607 A1 * | 7/2003 | Raghavan et al. | 455/132 |

* cited by examiner

*Primary Examiner*—Mohammad H Ghayour
*Assistant Examiner*—Eboni Giles
(74) *Attorney, Agent, or Firm*—Suiter Swantz pc llo

(57) ABSTRACT

An improved method and apparatus for transmitting digital signals in a communications channel by compensating for distortions due to attenuation of high frequency components suffered by the digital signals. In a preferred embodiment, the digital signals are pulses and the compensation is performed at the transmitter without the need for an emphasis driver, by widening the pulses to compensate for the distortion in the channel that results in narrowing of the pulses incurred in the channel. The resulting pulse train is pre-compensated for the distortions caused by the communications channel. The amount of pre-compensation can be determined statically or dynamically.

14 Claims, 3 Drawing Sheets

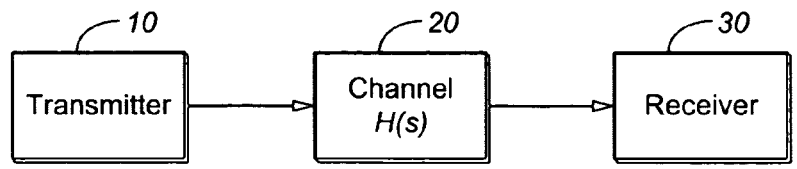
FIG._1
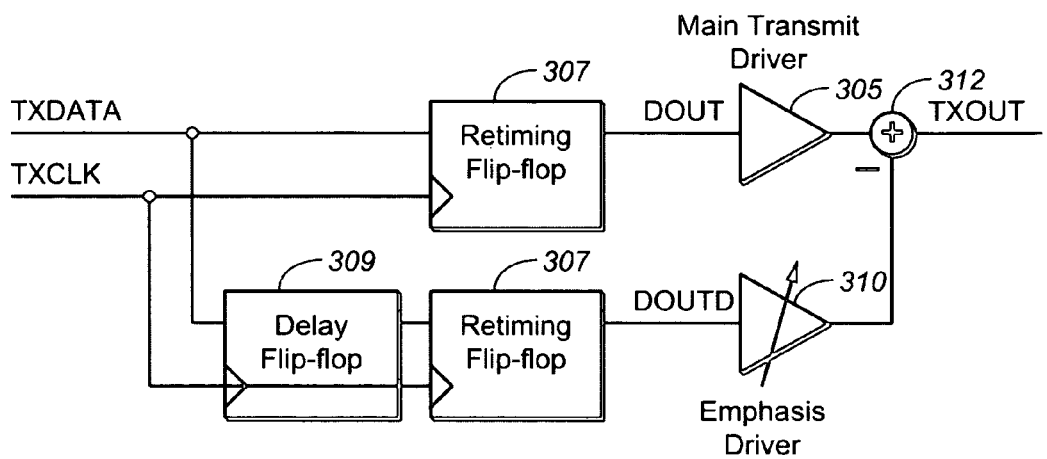
FIG._3
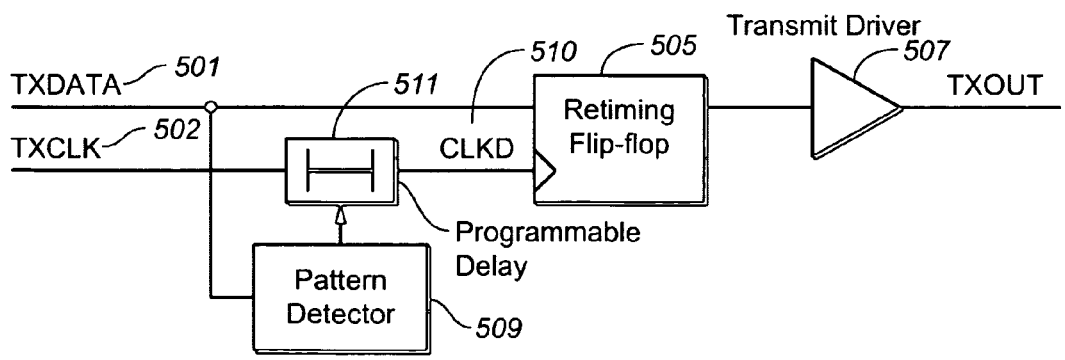
FIG._5

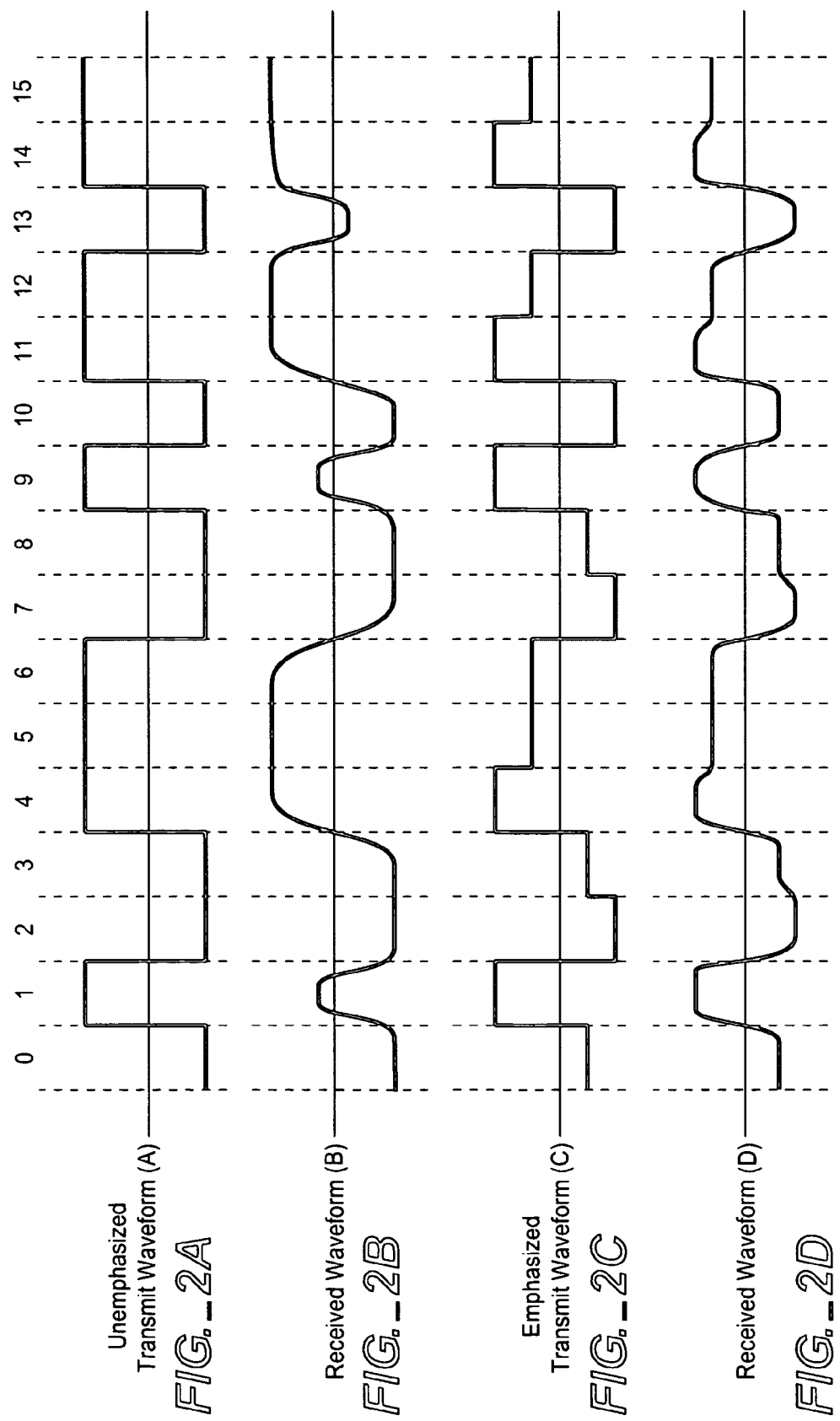

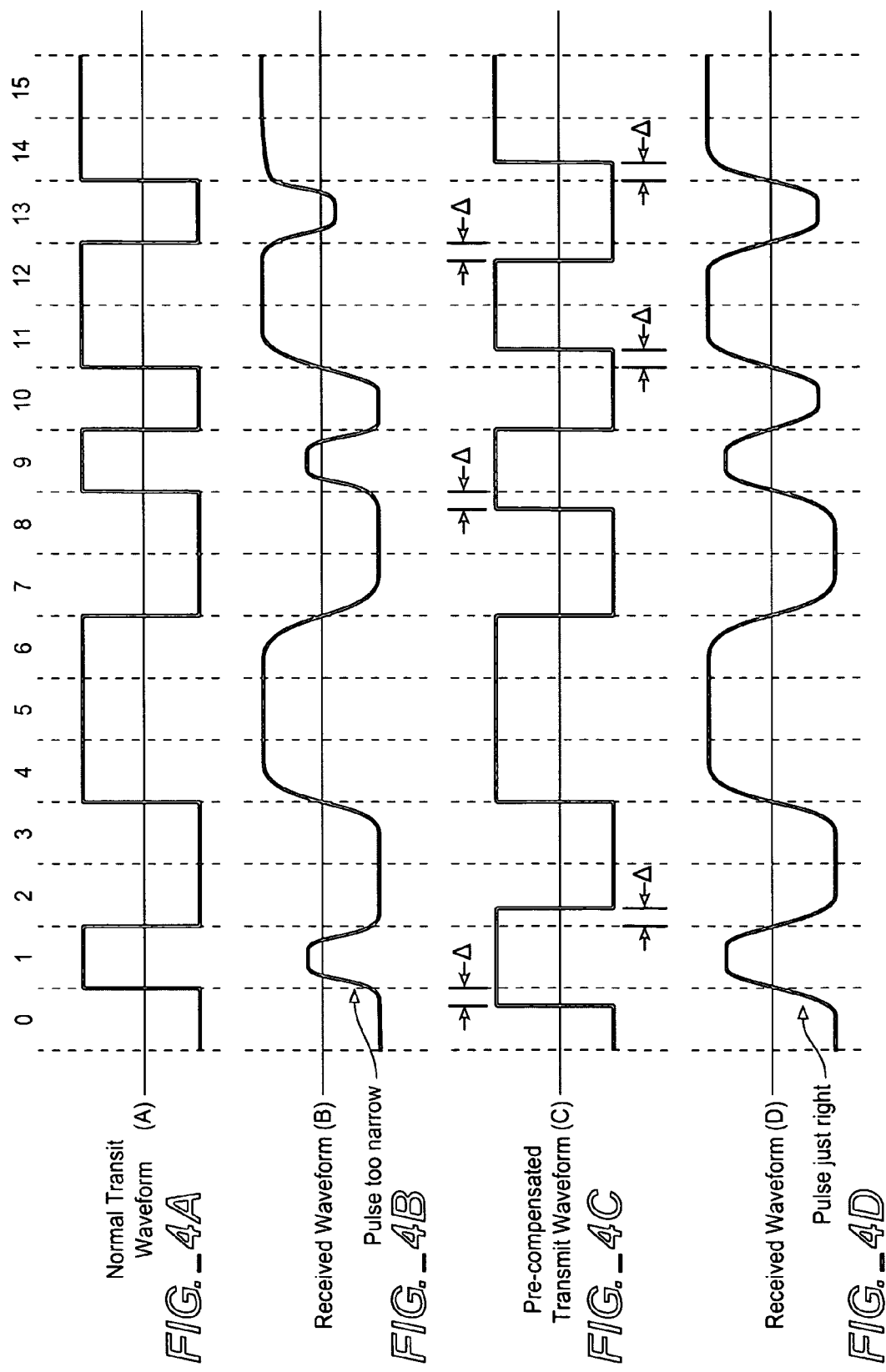

SYSTEM AND METHOD FOR TRANSMIT TIMING PRECOMPENSATION FOR A SERIAL TRANSMISSION COMMUNICATION CHANNEL

BACKGROUND OF THE INVENTION

1. Field of Invention

The present invention relates generally to the field of transmitters in mixed-signal communication channels of the kind used in serial transmissions.

2. Description of Related Art

Signal processing in digital communications is concerned with optimizing performance given the constraints of power, noise, bandwidth limitations, area, memory, sampling limitations and numerous other requirements depending on the architecture employed.

Data communication is moving away from parallel busses and towards serial transmission and serial protocols. System designers are under pressure to reliably send data over low bandwidth channels at rates for which they may not have been optimally designed for, and to pack more communication channels into smaller and smaller spaces. This results in increasingly poorer receive signal levels and higher levels of crosstalk, among other problems. Those who design transmitters for these systems need to find ways of improving the quality of the signals seen by the receiver.

A typical system is shown in FIG. 1. A transmitter 10 sends serial data, typically digital signals in the form of pulses, out through the channel 20, having a channel response transfer function H(s), and is picked up by a receiver 30. The output of the transmitter is a wide bandwidth digital signal. The channel 20 can be a mixed-signal channel utilizing both analog and digital signals. Channel 20, which could be a backplane, a PCB trace, a cable, an optical link, an internet or interchip connection, or any other communications channel, generally has been found to act as a lowpass function filter which filters out the high frequency energy from the transmit signal, as generally the channel is limited in bandwidth. By the time the transmitted signal from the transmitter passes through the communications channel 20 and is received by the receiver, the transmitted signal could be significantly degraded due to this loss of high frequency energy. This losses causes short (1 to 2 bit time) pulses to be narrowed in width (period) and reduced in height (amplitude).

One solution to this problem is to boost the high frequency components of a signal at the transmitter to compensate for the high frequency loss in the channel. This is frequently called transmit emphasis. But existing systems that employ transmit emphasis suffer from numerous disadvantages, as explained further herein.

Concomitantly, many receiver designs employ some sort of equalization to boost high frequency signals that are attenuated as the signal passes through the channel. This might be realized using a linear high pass filter, that boosts the high frequency signal was well any associated noise, and thus the signal-to-noise ratio (SNR) remains poor.

Another technique for handling attenuation of high frequency signals by communication channels is to employ decision feedback equalization/equalizers (DFE) at the receiver end, to help remove noise and distortion of digital signals, such as intersymbol interference (ISI) caused by attenuation of high frequencies. Some of the problems associated with digital signal processing as addressed by DFE are outlined in U.S. Pat. No. 6,437,932 to Prater et al., commonly assigned to the present assignee, and incorporated herein in its entirety.

Factoring all of the above, it can be seen that what is needed is a superior method and apparatus for reducing distortion in communication channels when transmitting digital data that contains high frequency signals in a mixed-signal communications channel.

To better understand the advantages of the present invention, FIGS. 2-3 disclose existing solutions, that the present invention improves upon.

Turning now to FIGS. 2A-2D, there are shown a idealized waveform diagrams for a typical system that employs transmit emphasis of a transmitted signal. The unemphasized transmit waveform sent by a transmitter, such as transmitter 10 in FIG. 1, is shown as waveform (A), FIG. 2A, labeled "Unemphasized Transmit Waveform". The received waveform received by a receiver, such as receiver 30 in FIG. 1, after channel distortion caused by a channel, such as channel 20 having transfer function H(s) in FIG. 1, is shown as waveform (B), labeled "Received Waveform", FIG. 2B. Waveform B has distortion, as can be seen by viewing bits 1, 9 and 13, inter alia, which have a height (amplitude component) and width (period component) less than ideal.

The idea behind transmit emphasis is for the high frequency components of the transmitted signal to be boosted at the transmitter side of the system, to compensate for the high frequency loss in the channel, so that the received signal will be improved. Thus the first bit of a digital pulse train, after each transition, is sent with a larger amplitude than subsequent bits, increasing the high frequency energy content relative to the low frequency energy content, since any transition or edge in a pulse train will have higher frequency components. This is shown graphically in FIG. 2C, as waveform (C), labeled "Emphasized Transmit Waveform". Thus, at pulse transition 3 to 4 (from left of waveform), where there is no transition from LOW to HIGH in the Unemphasized Transmit Waveform, (A) in FIG. 1, for the Emphasized Transmit Waveform, the fourth pulse bit (bit 3) has a slightly different height (amplitude) than the third pulse bit; likewise, at pulse 9 (bit 8); pulse 13 (bit 12); pulse 16 (bit 15), the amplitudes are slightly different at the transition from their neighbors, thus having different emphasis, in order to increase the high frequency energy content relative to the low frequency energy content.

The waveform received after transmission of the Emphasized Transmit Waveform (C) through the channel is shown in FIG. 2D as waveform (D), labeled "Received Waveform", which contains less distortion than received waveform (B), such as seen by comparing the two waveforms bits 1, 9 and 13.

The circuit to implement the Emphasized Transmit Waveform is shown in FIG. 3. A 2-tap FIR (Finite Impulse Response) filter is shown in the transmitter. The data to be transmitted, TXDATA, is retimed on clock line TXCLK and presented to the Main Transmit op-am driver 305 on timing signal line DOUT. The data to be transmitted is also delayed by the Delay flip-flop 309 and inverted, retimed and presented to the Emphasis driver op-amp 310 on timing signal line DOUTD for presentation to summer 312, with the aid of two Retiming Flip-Flops 307. As shown, the Emphasis driver 310 is has a programmable drive strength to control the amount of de-emphasis to increase the high frequency to low frequency energy content in the transition bits. The two driver outputs are combined at summer 312, with suitable inversion as necessary, as inversion generates de-emphases, to form TXOUT, the emphasized transmit signal output to the channel.

Notwithstanding the above, existing systems of transmit emphasis have several disadvantages in practice. In a transmit emphasis system such as shown in FIG. 2, ideally a system designer would set the transmit amplitude to maximize noise immunity, and then would use emphasis to increase the amplitude of the transition bits to improve the "eye" (a test pattern that measures the health of a communications channel). In reality, however, as semiconductor technology progresses, power supply voltages shrink. This makes it difficult to transmit large amplitude signals, so emphasis usually means transmitting maximum amplitude after the transitions and less than maximum amplitude on subsequent bits. The result is that in practice increased emphasis levels result in decreased available transmit amplitude.

Secondly, increasing the high frequency energy transmitted increasing the amount of crosstalk seen by receivers that may be nearby. This can turn a usable system into an unusable system.

Thirdly, increased high frequency energy in the transmit signal can exaggerate the effect of resonance in the channel and cause increased radiated EMI. Radiating EMI causes EMI compliance difficulties. Resonance can be due to reflections from connectors or stubs.

Fourthly, emphasis such as shown in the existing system of FIG. 3 requires at least one extra driver stage connected to TXOUT. This adds capacitance to the output, which reduces the bandwidth of the driver and increases reflections in the channel.

Lastly, channels that employ optics have additional amplitude limiting stages in the electro-optical conversion process. Amplitude modulation does not compensate past the electrical channel leading to the optics.

The present invention attempts to overcome the above-mentioned disadvantages and ameliorate the system of amplitude boosting high frequencies signals at the transmit end of a system employing a transmitter, communication channel and receiver.

SUMMARY OF THE INVENTION

Accordingly, an aspect of the present invention is an improved method and apparatus for transmitting digital signals in a communications channel by compensating for distortions suffered by the digital signals. In a preferred embodiment, the digital signals are in pulses and the compensation is performed at the transmitter, by selectively shifting the phase and/or changing the width of the pulses to compensate for the distortion in the channel that results in narrowing of the pulses incurred in the channel.

The method and apparatus of the present invention consumes less power, has numerous advantages related to transmit amplitude of a signal, reduces the capacitance at the transmitter output, which improves the quality of the transmitted signal and reduces reflections of the signal in the channel, and generally helps overcome the attenuation of high-frequencies and the low-bandpass filter problem of mixed signal communication channels.

Further advantages of the present invention are that it allows data-dependent jitter that the communication channel generates to be compensated for at the transmitter end without altering the transmit amplitude, unlike existing solutions such as the transmit emphasis systems as shown in FIGS. 2-3. This generally reduces the number of components in the transmit signal path, which reduces the power consumption of the system. In addition, contrary to the FIG. 3 system, the present invention eliminates the need for an emphasis driver(s), which reduces the capacitance at the transmitter output, and improves the quality of the transmitted signal and reduces reflections in the channel.

This equalization can be used to compensate for the bandwidth limiting inherent in the electro-optical conversion process. This generally increases the range for a given power consumption of the optical transmission medium.

While in the preferred embodiment the present invention is directed to a serial transmission protocol system involving digital data in the form of a pulse having a pulse width, other types of protocols and data can also be accommodated by the present invention without departing from the teachings thereof.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 1 is a block diagram of a typical system for a serial transmission mixed-signal communications channel employed in a high-speed serial communication circuit.

FIGS. 2A-2D are waveform diagrams for a typical system that employs transmit emphasis of a transmitted signal.

FIG. 3 is a circuit diagram employing a 2-tap FIR filter for a transmit emphasis system having the waveform diagram of FIG. 2.

FIGS. 4A-4D are waveform diagrams for a preferred embodiment of the present invention.

FIG. 5 is one preferred circuit for deploying the transmit timing precompensation of the present invention having the waveform diagram of FIG. 4.

It should be understood that one skilled in the art may, using the teachings of the present invention, vary embodiments shown in the drawings without departing from the spirit of the invention herein.

DETAILED DESCRIPTION OF THE INVENTION

Turning attention to FIGS. 4A-4D, there are shown a waveform diagrams for a preferred embodiment of the present invention. The normal Transmit Waveform, comprising a series of digital signals in the form of pulses in a pulse train, that can be a series of bits (labeled 0 to 15 in FIG. 4A), is shown as waveform (A). It is understood that a digital signal can be composed as a series of sinusoidal analog signals, as with a Fourier Series decomposition. The pulses include return-to-zero, RZ, non-return-to-zero, NRZ, binary and multi-level signaling. For clarity, the invention is shown using NRZ data, but the teachings herein apply to other data encodings.

The Received Waveform, after distortion by the communications channel, such as channel 20 in FIG. 1, is shown as waveform (B), FIG. 4B. Note the pulse at bit 1 is too narrow, labeled as "pulse too narrow" (FIG. 4B). The present invention attempts to compensate for distortion by widening the pulses at the transmitter to compensate for the narrowing incurred in the channel, rather than simply boosting the high frequency content of the transmit signal. The widening of pulses is termed Transmit Timing Precompensation (TTP), and the circuitry that performs the widening is termed TTP circuitry.

Thus, as shown in Pre-Compensated Transmit Waveform (C) (FIG. 4C), showing a plurality of pulse bits in a pulse train, where there is a need for compensating for bits where distortion is likely to narrow the pulses, the pulses are widened. This might be in places such as there are few transitions from HIGH to LOW or vice versa, such as shown in FIGS. 4A-4D, by way of example, at the transition between: bits 0, 1; 1, 2; 8, 9; 10, 11; 12, 13; 13, 14; which are shown widened from the normal transmit waveform by an amount DELTA as indicated (FIG. 4C).

In the present invention several consecutive pulse bits may be inspected and the pulse width of the bits widened for transmission through the channel 20. The bits may be inspected and then widened, or, the bits may be, by delaying bits before transmission, widened and then inspected, with additional pulse bit width modulation as necessary. In the alternative or in addition, there may be a widening of all pulses by a predetermined amount, the predetermined amount determined by the channel characteristics of channel 20, such found from the transfer function H(s) of the channel, or there may be selective widening of certain predetermined pulses after transmitting a given number of consecutive pulse bits, with the amount to be widened determined by the channel characteristics of the channel 20. The channel characteristics of channel 20 may be determined upon initialization and startup of transmission by the transmitter, or, the channel characteristics may be determined over time, and the widening of pulses (the amount of precompensation) may be periodically adjusted in accordance with the channel characteristics. The amount of precompensation based on channel characteristics may be static, and determined once, or dynamic, and determined over time on a real-time basis.

In the present invention, every bit of digital data is transmitted at the same amplitude, but narrow pulses are widened at the transmitter in anticipation of their being narrowed by the channel. The net result is that after transmission of the Pre-Compensated Transmit Waveform (C) through the channel, the Received Waveform, (D) in FIG. 4D, has pulses of the right width, such as, by way of example, as indicated by the label "pulse just right" at pulse bit 1 (FIG. 4D).

Turning attention to FIG. 5, there is shown TTP circuitry for a preferred embodiment of implementing the Transmit Timing Precompensation of the present invention. Data to be transmitted is presented at TXDATA, along with a synchronous clock line TXCLK. The data is retimed by the Retiming Flip-Flop 505, which may be any kind of flip-flop, having a data input and a clock input at clock line CLKD. The data is retimed by the Retiming Flip-Flop 505, in accordance with the present invention, so that narrow pulses are widened, then driven out by the Transmit Driver 507. A pattern detector 509 looks at several consecutive TXDATA bits and provides information to adjust the timing of the Retiming Flip-Flop 505, via the clock line CLKD by adjusting the amount of programmable delay in programmable delay 511. The pattern detector 509 can add latency in the data system in order to be able to look at the data pre- and post cursor. In this case the data would be delayed by a number of bits of lookahead that were needed. A demonstration of this lookahead is in FIG. 4C, comparing bit 10 versus bit 2; bit 10 is not delayed but bit 2 is, and the only difference is the next bit.

The programmable delay 511 is used to adjust the width of the pulses output by Retiming Flip-Flop 505 by providing information to adjust the timing and gating of the Retiming Flip-Flop 505 through clock line CLKD, and thus the timing of the edges of the pulses that are output by the Retiming Flip-Flop 505. The pulses ultimately are transmitted through a communications channel through Transmit Driver 507 at output line TXOUT. If the channel characteristics of the communication channel over which the Transmit Driver 507 transmits data TXOUT are known, as can be measured by suitable circuitry (known per se in the art and can be included in the pattern detector block 509 to adjust the programmable delay 511), the timing edges at TXOUT can be set using the clock delay mechanism provided by programmable delay 511, in order to compensate for the timing shift caused by the channel and minimize the jitter at the receiver end of the channel.

The TTP circuitry for the FIG. 5 embodiment includes the combination of Retiming Flip-Flop 505, pattern detector 509 and programmable delay 511, which work together to widen the pulses driven by Transmit Driver 507. The effect of TTP circuitry by widening the pulse bits in a digital signal is to increase the high frequency to low frequency energy over a longer period without the need of a emphasis driver, as per the Emphasis Driver 310 in the FIG. 3 circuit. From the teachings herein, one of ordinary skill in the art can devise any number of specific algorithms for the logic of the pattern detector 509.

In general, the present invention teaches that a signal being transmitted through a communication channel may be compensated at the transmitting end of the channel, for the loss of high frequency signals in the channel, through the use of phase encoding, which in a preferred embodiment herein employs Transmit Timing Precompensation (TTP) circuitry to widen the pulse bits of a pulse bit train. In general, the digital signal is modified by the TTP circuitry to selectively change any combination of the frequency (or period) and/or phase of selective pulses of the pulse train in the time domain, generally termed phase encoding or precompensating by phase encoding, which has the effect of changing the signal spectrum energy of the digital signal in the time domain; which in a preferred embodiment, as taught herein, results in the modified, precompensated digital signal pulse train having a lower spectral energy over a generally wider period pulse bit. When this precompensated digital signal pulse train passes through the lowpass communication channel, the precompensated signal will suffer less high frequency component loss, without the need for an emphasis driver as in prior techniques.

The advantages of the Transmit Timing Precompensation of the present invention is that it allows the data-dependent jitter that the communication channel generates to be compensated for at the transmitter end without altering the transmit amplitude, as in existing solutions such as the transmit emphasis systems of FIGS. 2-3. This generally reduces the number of components in the transmit signal path, which reduces the power consumption of the system. In addition, contrary to the FIG. 3 system, the present invention eliminates the need for an emphasis driver(s), which reduces the capacitance at the transmitter output and reduces reflections in the channel. Further, although the present invention has been described in terms of the preferred embodiments above, numerous modifications and/or additions to the above-described preferred embodiments would be readily apparent to one skilled in the art. Thus, while distortions due to high frequency component attenuation are primarily addressed, it is possible that other distortions can be also suitably addressed by the transmit timing precompensation apparatus of the present invention, using the teachings of the present invention, including low-frequency and phase shift distortions. It is intended that the scope of the present invention extends to all such modifications and/or additions and that the scope of the present invention is limited solely by the claims set forth below.

We claim:

1. A Transmit Timing Precompensation circuit for digital signals transmitted in a communications channel, comprising:
  a transmit timing precompensation (TTP) circuit, said TTP circuit configured for receiving a plurality of digital pulse signals in a pulse train, each of said digital pulses having an original width;
  a programmable delay operatively connected to said TTP circuit, said programmable delay configured for providing information to said TTP circuit to selectively widen said digital pulses;
  a pattern detector receiving said digital pulse signals prior to said pulses being received by said TTP circuit, said pattern detector operatively connected to said programmable delay and said TTP circuit, said pattern detector configured for inspecting several consecutive pulses in said digital signal pulse train and providing said TTP circuit with information to adjust the timing of said TTP circuit via said programmable delay; and
  a transmit driver receiving said digital signals from said TTP circuit and transmitting said digital signals over a communications channel;
  wherein said TTP circuit selectively widen only digital pulses having original widths narrower than a width determined by said pattern detector upon inspecting several consecutive pulses.

2. The apparatus of claim 1, further comprising:
  means for measuring the channel characteristics of the communication channel over which the TIP circuit transmits said pulse train;
  said programmable delay programmed by said means for measuring the channel characteristics.

3. The apparatus of claim 1, wherein said transmit timing precompensation (TIP) circuit is used with a channel that is an electro-optical channel.

4. The apparatus of claim 1, wherein:
  said TTP circuit comprises a Retiming Flip-Flop having a data input line and a clock signal input line.

5. The apparatus of claim 4, wherein:
  said Retiming Flip-Flop receiving said digital pulses in said data input line, and a clock signal in said clock signal input line, and said TTP circuit further comprises said programmable delay connected to said clock signal input line of said Retiming Flip-Flop.

6. The apparatus of claim 5, wherein:
  said pattern detector detecting several consecutive pulses in said digital signal pulse train and providing information for adjusting the timing of said Retiming Flip-Flop via said clock signal input line.

7. A method for Transmit Timing Precompensation (TTP) using a TTP circuit in a communication channel receiving a digital pulse train, the communication channel having channel characteristics of transfer function H(s) and attenuating high frequency signals, comprising the steps of:
  determining the channel characteristics of said communication channel:
  precompensating a digital signal to be transmitted in the communication channel by phase encoding according to the channel characteristics of said communication channel;
  wherein the step of phase encoding comprises changing the digital signal by changing the spectral energy of the signal, said change in the spectral energy of the signal selected from the group consisting of selectively changing the frequency of the pulse data, selectively changing the phase of the pulse data, or selectively changing the period of the pulse data;
  wherein said digital signal comprises a plurality of pulses forming pulse data, said pulses having high frequency components distorted by the communication channel, and wherein precompensating the digital signal comprises changing the digital signal by selectively widening only the pulses in said pulse data having original pulse widths narrower than a width determined based on the channel characteristics: and,
  transmitting said precompensated digital signal.

8. The method according to claim lift 7, further comprising:
  using said transmit timing precompensation (TTP) circuit with a channel that is an electro-optical channel.

9. The method according to claim 7, wherein:
  the step of changing the digital signal by selectively widening the pulse width of the pulses in said pulse data comprises using programmable delay, said programmable delay input into the clock line of a flip-flop used for said selective widening of said pulses.

10. The method according to claim 7, further comprising the step of:
  detecting the pattern of the pulse data prior to precompensation, and selectively widening the pulses according to the pattern detected.

11. The method according to claim 10, further comprising the step of:
  determining the channel characteristics of said communication channel, prior to the step of phase encoding, and selectively widening said pulse data to be precompensated by phase encoding according to the channel characteristics of said communication channel.

12. The method according to claim 11, wherein:
  said step of selectively widening said pulse data is by widening all of the pulses in said pulse data by a predetermined amount according to the determined channel characteristics of said communication channel.

13. The method according to claim 11, wherein:
  said step of selectively widening said pulse data is by selectively widening some of the pulses in said pulse data by a predetermined amount determined after a predetermined number of consecutive pulses are transmitted, and after determining said channel characteristics of said communication channel in response to the predetermined number of consecutive pulses being transmitted.

14. Transmit Timing Precompensation for digital signals transmitted in a communications channel, comprising:
  means for precompensating a plurality of digital pulse signals in a pulse train, said digital pulses having a first width; said precompensation means selectively widening said digital pulses from said first width to a second width and outputting said pulses in a pulse train;
  programmable means for delay connected to said precompensation means, said programmable delay means providing information for said precompensation means to selectively widen said digital pulses; and
  means for transmitting said digital signals received from said precompensation means over a communications channel;
  wherein said means for precompensating said plurality of digital pulse signals in said pulse train selectively widen only digital pulses having first widths narrower than a width provided by said programmable means for delay.

* * * * *